Oct. 16, 1928.

M. WOLFF 1,687,702

CONFECTION MAKING MACHINE

Filed Dec. 9, 1927   3 Sheets-Sheet 1

Max Wolff, INVENTOR

By Victor J. Evans, ATTORNEY

Oct. 16, 1928.  
M. WOLFF  
1,687,702  
CONFECTION MAKING MACHINE  
Filed Dec. 9, 1927      3 Sheets-Sheet 2
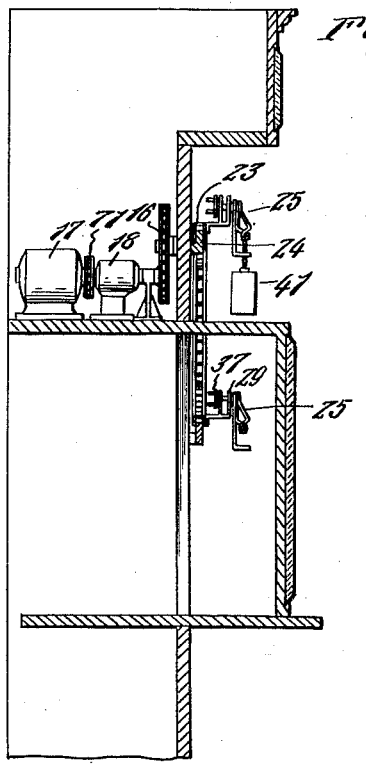
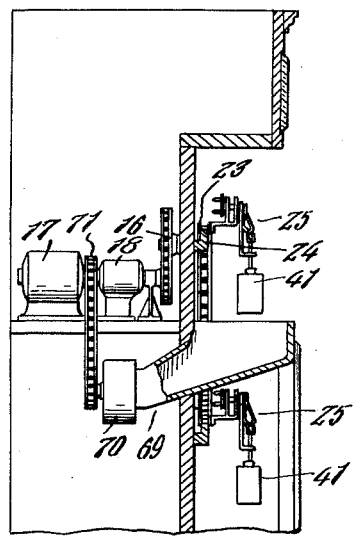
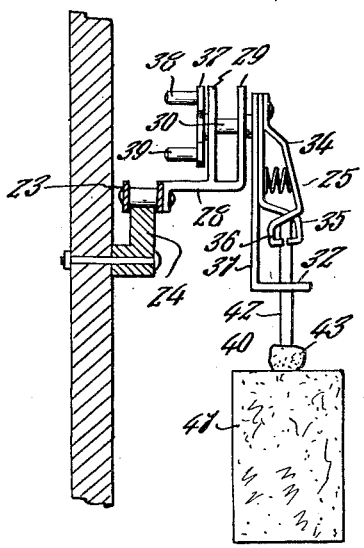
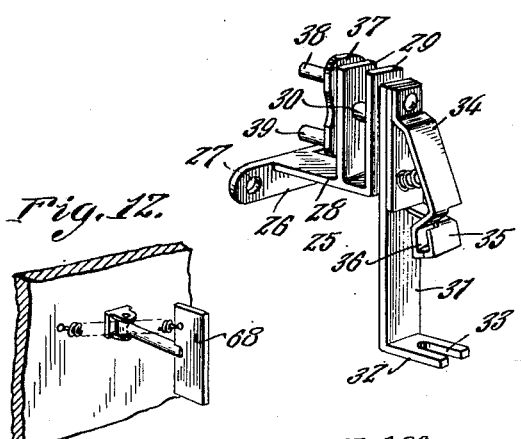
Max Wolff  
INVENTOR  
BY Victor J. Evans  
ATTORNEY Oct. 16, 1928.
M. WOLFF
1,687,702
CONFECTION MAKING MACHINE
Filed Dec. 9, 1927  3 Sheets-Sheet 3
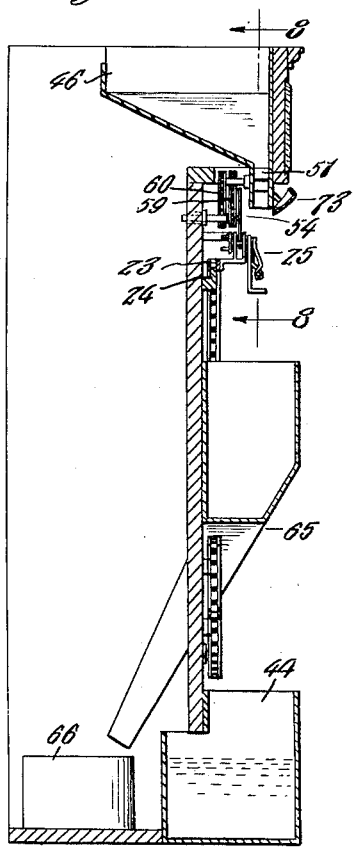
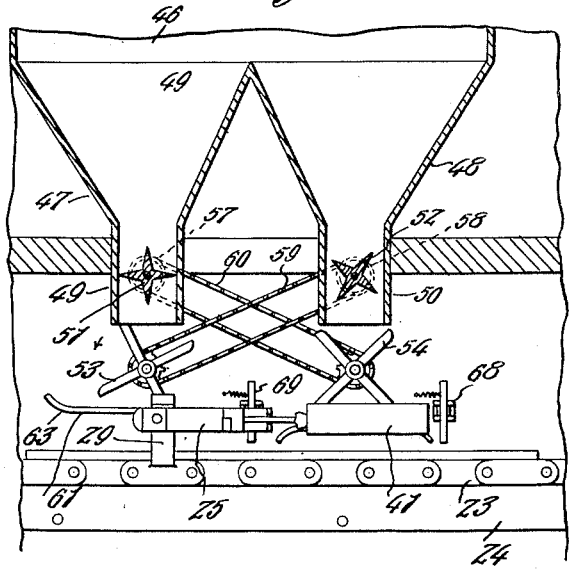
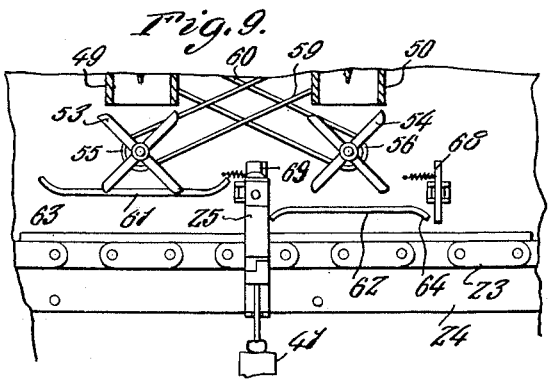
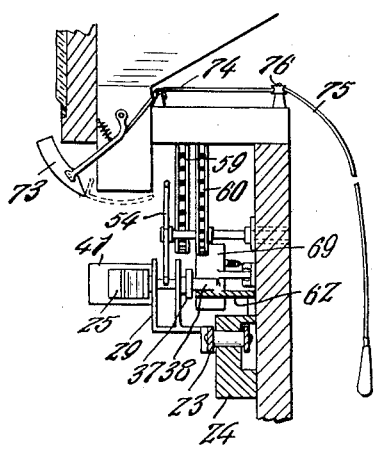
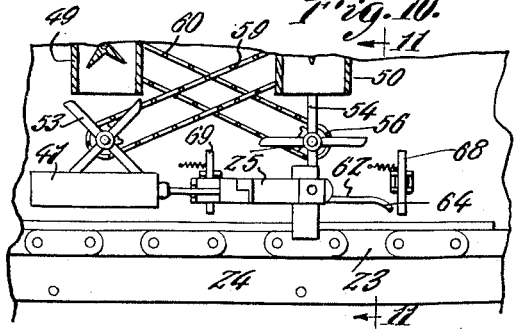
Max Wolff
INVENTOR
BY Victor J. Evans
ATTORNEY Patented Oct. 16, 1928.

1,687,702

UNITED STATES PATENT OFFICE.

MAX WOLFF, OF CONEY ISLAND, NEW YORK.

CONFECTION-MAKING MACHINE.

Application filed December 9, 1927. Serial No. 238,922.

This invention relates to improvements in confection making machines.

The primary object of the invention resides in a machine for dipping an ice-cream confection into a bath of chocolate to provide a coating therefor, and for successively applying confectioner's sprills to opposite sides thereof to produce a highly decorative and tasty confection.

Another object of the invention is to provide a machine for the above purpose which is automatic in its action other than necessitating an attendant to position the same on the machine and remove the same therefrom when finished.

A further object is the provision of a confection machine for applying a coating of chocolate and sprills to a brick of ice-cream on a stick which includes an endless chain to which the plain stick of ice-cream is attached at certain spaced distances and which are subjected to a bath of chocolate and a sprinkling of sprills, the speed of the chain being so timed that the coating of chocolate is partially dry when applying the sprills thereto whereby the sprills will instantly adhere thereto.

A still further object is to provide a confection machine in which certain novel working parts are exposed to view for attracting the attention of the public thereto when the machine is installed at amusement parks, beaches and the like and which will encourage the public to purchase the confection as it will be observed that the system is highly sanitary.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 3 is a vertical transverse sectional view on the line 3—3 of Figure 1.

Figure 4 is a similar view on the line 4—4 of Figure 1.

Figure 5 is a similar view on the line 5—5 of Figure 1.

Figure 6 is a detail vertical sectional view on the line 6—6 of Figure 1.

Figure 7 is a detail perspective view of one of the carriers.

Figures 8, 9 and 10 are detail vertical sectional views through the sprill sprinkling mechanism showing the different positions of the parts during the sprinkling operation.

Figure 11 is a detail vertical sectional view on the line 11—11 of Figure 1.

Figure 12 is a detail perspective view of one of the stop gates.

Figure 1:
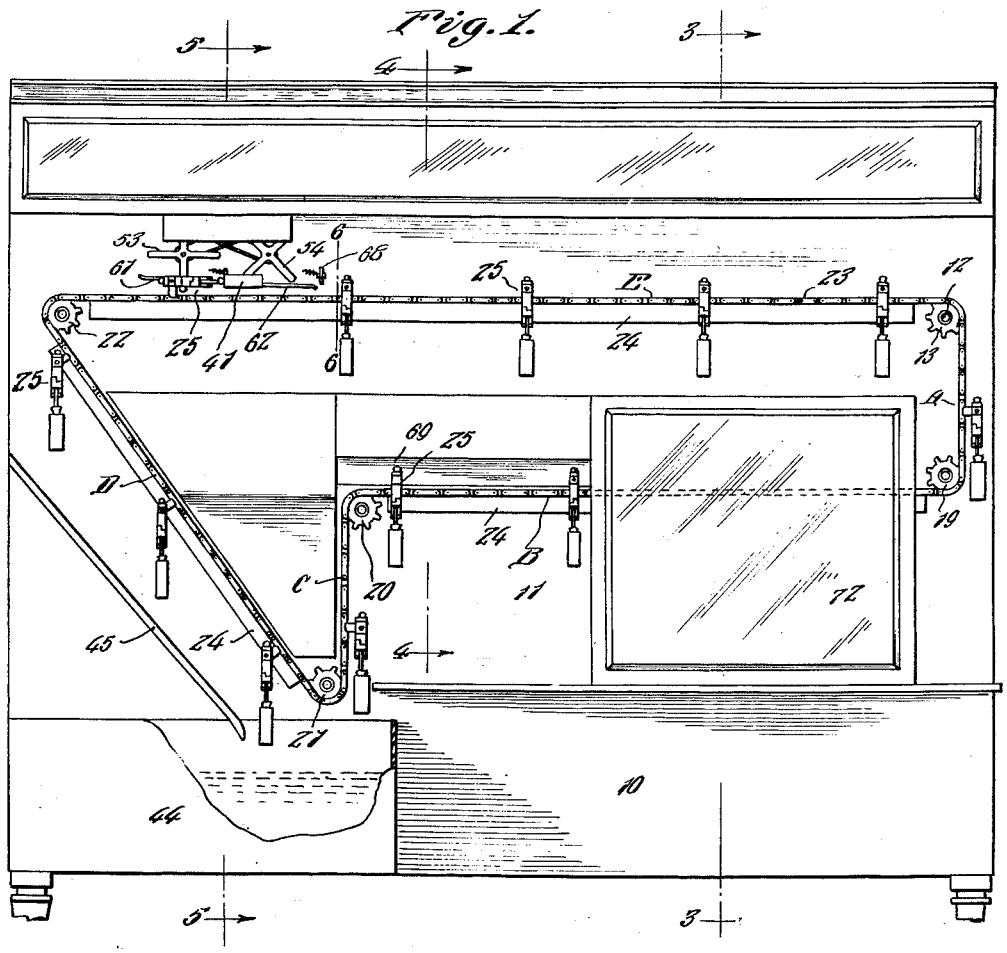
Figure 1 is a front elevation of my confection making machine.
Figure 2:
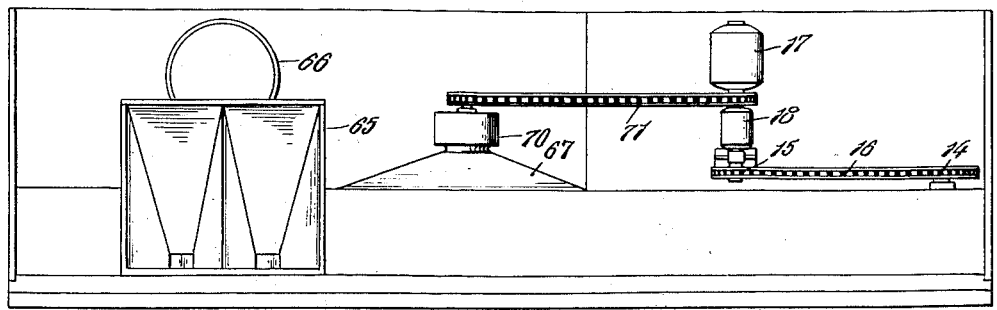
Figure 2 is a top plan view.

Referring to the drawings by reference characters, the numeral 10 designates a table structure or platform from which a front wall 11 rises. Journalled in the front wall adjacent the right edge thereof is a driven shaft 12 having a sprocket gear 13 fixed to the outer end thereof, while the inner end has a sprocket 14 thereon disposed in a plane with a sprocket wheel 15 and over which an endless sprocket chain 16 passes. The sprocket 15 is driven by an electric motor 17 through a speed reduction gearing 18, which are supported upon a shelf 19 extending inwardly from the wall 11. From this construction it will be understood that the motor 17 imparts a relative slow rotation to the sprocket gear 13 by reason of the reduction gearing or speed reducer 18.

Journalled for rotation on an even plane with the sprocket 13 are suitably arranged sprockets 19, 20, 21 and 22 all journalled for rotation on the outside of the front wall. The sprockets are so located as to provide an irregular course for an endless sprocket chain 23. By arranging the sprockets in the manner shown, the sprocket chain is divided into a plurality of separate leads namely, a vertical lead A between the sprockets 13 and 19, a horizontal lead B between the sprockets 19 and 20, a vertical lead C between sprockets 20 and 21, an angularly disposed lead D between sprockets 21 and 22, and a horizontal lead E between sprockets 22 and 13. Tracks or rails 24 extend from the outer side of the wall 11 beneath the leads B, D and E to prevent any sagging of the chain under its carrying load.

Mounted on the chain 23 at suitably spaced distances are carriers 25 which are clearly illustrated in Figures 6 and 7 of the drawings. Each carrier includes an attaching plate 26 having openings 27 therein for register with the pivot openings in the link of the chain to which it is attached and through which the pivot pins extend. An arm 28 extends from the attaching plate from which spaced vertical ears 29 rise. The ears serve as bearings for a stub shaft 30, one side of which supports a depending arm 31 having a foot 32 at the lower end thereof in which a bifurcation or slot 33 is provided. The arm 31 swings with the turning of the shaft 30 and fixed thereto is a clip 34 embodying a fixed jaw 35 and a spring pressed pivoted jaw 36 for co-action therewith. The inner end of the stub shaft 30 has a plate 37 fixed thereon from which diametrically opposed pins 38 and 39 extend and by the actuation of which the arm 31 is swung in opposite directions as will be hereinafter explained.

The carriers are adapted to receive the confection to be dipped in a bath of chocolate or the like and later sprinkled with confectioner's sprills and which confection is shown at 40. The confection in the state in which it is placed into the machine consists of a brick of frozen ice-cream 41 into which one end of a stick 42 extends and on which a cherry or the like 43 is threaded. The ice-cream bricks are frozen to the sticks prior to their insertion into the machine by inserting the sticks into the bricks and placing them into an ice chest or refrigerator. This prevents the ice-cream bricks from accidentally dropping from the sticks when suspended from the carriers during their coating operation. The confections are held in the carriers by inserting the free end of each stick between the co-acting jaws 35 and 36 with the shank of the stick disposed in the bifurcation 33 to support the confection rigid with the arm 31.

Supported by the table 10 below the sprocket wheel 21 is a tank 44 adapted to contain a substance such as chocolate in which the confection is immersed in its movement over the irregular course. As the confections successively move out of the chocolate bath and are carried upward over the lead D, any chocolate which may drip therefrom is caught by an inclined drip pan 45 and returned to the tank.

Mounted above the lead E of the sprocket chain is a box-like casing 46 having separate hopper bottoms 47 and 48 which communicate within the casing for evenly receiving the confectioner's sprills 49 adapted to be contained therein. The hopper bottoms 47 and 48 have reduced outlet necks 49 and 50 respectively which open on a vertical plane with the confection held by said carriers.

Arranged within the necks 49 and 50 are rotatable valves 51 and 52 respectively and which are identical in construction. Each valve is shaped like a four pointed star in cross section and is capable of dispensing a predetermined amount of sprills on each quarter revolution.

Journalled to the front wall below the respective hoppers but inward of the discharge openings thereof are cross shaped members 53 and 54. The shafts on which the members 53 and 54 are mounted have sprocket wheels 55 and 56 respectively fixed thereon, while the outer projecting ends of the valves 51 and 52 have sprocket wheels 57 and 58. A sprocket chain 59 passes over the sprocket wheels 55 and 58 while a similar sprocket chain 60 passes over the sprockets 56 and 57 whereby movement of the actuating members 53 and 54 will impart movements to the respective valves 52 and 51. The normal position of the cross shaped actuating member is shown in Figure 9 of the drawings in which the cross arms are disposed at approximate 45° angle and which are movable one quarter of a revolution upon each actuation by the carriers for dispensing a predetermined amount of sprills.

Disposed on a plane below the axis of the actuating members are cam plates 61 and 62, the same being on different horizontal planes to be respectively and successively engaged by the pins 38 and 39 of the carriers. The ends of the plate 61 are turned upward as at 63 while the ends of the plate 62 are turned downwardly as at 64. As a carrier moves along the lead E after having dipped its confection into the chocolate, the pin 38 of the same strikes the upturned lip 63 of the plate 61 and rides under the plate to swing the arm 31 to a horizontal position as shown in Figure 8 of the drawings and as it moves lengthwise of the plate, the stub shaft 30 strikes one of the arms of the actuating member 53 which is in its path, thus imparting a one-quarter revolution thereto. The carrier having previously been swung to a horizontal position, presents one face of the ice-cream brick upward beneath the discharge end of the hopper bottom 28, the valve 52 of which is momentarily opened by the quarter revolution imparted to the actuating member 53. The valve 52 releases a predetermined amount of sprills which drop onto the upper side of the chocolate coated ice-cream brick and any loose sprills drop to a chute 65 where they are carried to a container 66 for further use. When the pin 38 rides off the end of the plate 61, the weight of the carrier arm 31 and its load will cause the dropping of the same to a vertical position but to prevent any accidental swinging of the carrier arm, I provide a spring actuated pivoted gate 69 in the path of the pins 38 and 39 which tends to arrest any swinging of the same. After the carrier passes the gate 69, the pin 39 rides up the down turned lip 64 which is in the path thereof and up onto the plate 62 which swings the carrier arm and its load to a horizontal position to position the opposite surface of the confection beneath the outlet of the hopper 49. As the carrier moves over the plate, the stub shaft 39 engages one of the arms of the actuating member 54 and imparts a one quarter revolution thereto which turns the valve 51 a similar distance to dispense a predetermined amount of sprills which adhere to the upper surface of the confection. As the pin 39 rides off the end of the plate 62, the carrier will automatically drop to a vertical position by reason of its own weight and for arresting any accidental swinging of the same, I provide a spring gate 68 in the path of the pins 38 and 39.

For the purpose of drying and hardening the finished article, I provide an air deflector or funnel 67 which opens beneath the lead E of the sprocket chain and through which air is blown by a fan 70 driven by any suitable means 71 from the shaft of the motor 17.

From the foregoing description thus far, the operation of the machine is as follows:— An attendant positions himself behind the mirror 72 to attach the confections to the carriers while a second operator takes a position at the right end of the table adjacent the lead A to remove the finished confection from the carriers. The machine is put into motion by turning on the motor 17 which drives the sprocket chain 23 in the direction of the arrows shown in Figure 1 of the drawings. As the empty carriers 25 successively present themselves adjacent the operator, he attaches the partially completed confection to them in the manner hereinbefore explained. The confections hang downward and as they pass around the sprocket 21, they are dipped into the chocolate contained in the tank 44. In passing between the sprocket wheels 21 and 22, any excess chocolate will drip onto the drip pan 45 and drain back into the tank 44, while the chocolate remaining upon the confection will become partially hardened before being sprinkled with candy sprills released from the hoppers 47 and 48 in the manner already explained. After the sprills have been applied, the carriers with their finished confection move toward the sprocket wheel 13 but before reaching the end of their journey, the confection is thoroughly hardened by the air from the blower. The operator positioned adjacent the lead A of the sprocket chain releases the clamping jaws 34 and 35 from engagement with the stick 42 and either passes the same to a customer or stores them away in an ice chest.

In some instances, a customer may not care to purchase a confection having sprills thereon and for shutting off the flow from the discharge end of the hoppers 47 and 48, I provide a swingingly mounted closure plate 73 which is normally held in an open position by a contractile spring 74. The closure plate bridges both of the discharge openings in the sprill container when moved to a closed position by the actuation of a pull cord or cable 75 passing over pulleys 76 and having its free end within reach of the attendant who removes the confections from the machine. When an order is received for a confection without sprills, the attendant pulls upon the cable and holds the closure plate in a closed position until one of the confections has passed the gate 68. The valves 51 and 52 will of course dispense a quantity of sprills but they are caught by the closure plate. Upon release of the cables 75, the spring 74 moves the closure plate to an open position and any sprills contained thereon are emptied into the chute 65.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a confection making machine, a conveyor, driving means therefor, article carriers swingingly mounted on said conveyor, means disposed in the path of movement of said carriers for successively swinging said carriers in opposite directions, a container adapted to contain a supply of substance to be applied to the confection adapted to be suspended from said article carriers, and dispensing means operable for releasing the substance in said container after said article carriers have swung to the limits of their swinging movements in opposite directions.

2. In a confection making machine, an endless movable conveyor, means for driving said conveyor, carriers pivotally mounted on said conveyor, means on said carriers adapted to removably support articles of confection, a tank containing a liquid coating material to be applied to each of the articles of confection and disposed in the path of movement thereof, and automatic means operable for applying a shredded substance successively to opposite sides thereof.

3. In a confection making machine, an endless movable conveyor, driving means therefor, carriers pivotally mounted on said conveyor, means on said carriers adapted to removably support articles of confection, a container having two discharge openings therein and adapted to contain a coating substance for the article of confection, valve means for the respective discharge openings, means in the path of said carriers for swinging and supporting the same to a horizontal position to position one side of the article of confection face up beneath one of said discharge openings and successively swing said carriers in an opposite direction to a reverse horizontal position beneath the other of said discharge openings, and valve actuating means engageable by said carriers for successively opening and closing said valve means to dispense a predetermined amount of the contents of said container while the article of confection is in a horizontal position beneath the respective discharge openings.

4. In a confection making machine, an endless movable conveyor, driving means therefor, carriers pivotally mounted on said conveyor, means on said carriers for removably supporting an article of confection, a container having two discharge openings therein and adapted to contain a coating substance for the article of confection, valve means for the respective discharge openings, means in the path of said carriers for swinging and supporting the same to a horizontal position to position one side of the article of confection face up beneath one of said discharge openings and successively swing said carriers in an opposite direction to a reverse horizontal position beneath the other of said discharge openings, and valve actuating means engageable by said carriers for successively opening and closing said valve means to dispense a predetermined amount of the contents of said container while the article of confection is in a horizontal position beneath the respective discharge openings, and an air blast in the path of movement of, for acting upon the coated article of confection.

5. In a confection making machine, an endless driven conveyor, carriers pivotally mounted thereon, a dispensing container mounted above said conveyor and having a pair of discharge openings, valves for controlling the respective discharge openings, spaced pins carried by said carriers, a pair of cam plates respectively arranged below said discharge openings in the path of the respective pins for engagement thereby for successively swinging said carriers to opposite horizontal positions beneath the respective discharge openings, and valve actuating means engageable by said carriers for opening and closing the respective valves in timed accord with the swinging movements of said carriers.

6. In a confection making machine, an endless driven conveyor, carriers pivotally mounted thereon, a dispensing container mounted above said conveyor and having a pair of discharge openings, valves for controlling the respective discharge openings, spaced pins carried by said carriers, a pair of cam plates respectively arranged below said discharge openings in the path of the respective pins for engagement thereby for successively swinging said carriers to opposite horizontal positions beneath the respective discharge openings, and valve actuating means engageable by said carriers for opening and closing the respective valves in timed accord with the swinging movements of said carriers, and yieldable gates in the path of said carriers for engagement thereby after the pins successively pass off said cam plates for arresting any swinging movement of said carriers.

7. In a confection making machine, an endless driven conveyor, carriers pivotally mounted thereon, a dispensing container mounted above said conveyor and having a pair of discharge openings, valves for controlling the respective discharge openings, spaced pins carried by said carriers, a pair of cam plates respectively arranged below said discharge openings in the path of the respective pins for engagement thereby for successively swinging said carriers to opposite horizontal positions beneath the respective discharge openings, and valve actuating means engageable by said carriers for opening and closing the respective valves in timed accord with the swinging movements of said carriers and manually controlled means for closing the discharge openings irrespective of said valves.

8. A machine of the class described comprising a driven sprocket wheel, a plurality of idler sprocket wheels, an endless sprocket chain passing over all of the sprocket wheels, carriers pivotally mounted on said sprocket chain in suitable spaced relation, means on said carriers for removably suspending articles of confection therefrom, a tank containing a coating substance to be applied to the articles of confection and disposed in the path of movement thereof, a dispensing container mounted above said sprocket chain containing a supply of sprills and having a pair of discharge openings, valves for controlling the flow of sprills through the respective discharge openings, spaced pins carried by said carriers, a pair of cam plates respectively arranged below said discharge openings in the path of the respective pins for engagement thereby for successively swinging said carriers to opposite horizontal positions beneath the respective discharge openings, and valve actuating means engageable by said carriers for opening and closing the respective valves in timed relation to the swinging movements of said carriers.

9. In a confection making machine, a conveyor, driving means therefor, article supporting means on said conveyor, a dispensing mechanism adapted to contain and dispense the substance to be applied to the articles of confection held by said article supporting means, and actuating means automatically operable for actuating said dispensing mechanism in timed accord with the speed of travel of said conveyor.

In testimony whereof I have affixed my signature.

MAX WOLFF.